March 10, 1964 T. P. SYLVAN 3,124,703
SEMICONDUCTOR DEVICES
Filed June 13, 1960

INVENTOR:
TAGE P. SYLVAN,
BY Julius J. Zaskalicky
HIS ATTORNEY.

United States Patent Office 3,124,703
Patented Mar. 10, 1964

3,124,703
SEMICONDUCTOR DEVICES

Tage P. Sylvan, Liverpool, N.Y., assignor to General Electric Company, a corporation of New York Filed June 13, 1960, Ser. No. 35,606
10 Claims. (Cl. 307—88.5)

The present invention relates, in general, to semiconductor devices of the multi-layer, multi-electrode type having switch-like characteristics and, in particular, to improvements in semiconductor devices of the kind disclosed in a copending patent application, Serial Number 838,504, Richard W. Aldrich and Nick Holonyak, Jr., filed September 8, 1959, and a patent application, Serial Number 35,336, Joseph Moysen, filed June 10, 1960, both assigned to the assignee of the present invention.

The devices described in the aforementioned applications include a pair of main current-carrying electrodes and at least one control electrode. When connected in circuit, large current flow across the main electrodes is blocked until a small control current of suitable magnitude is applied to the control electrode.

In the first of the above-mentioned patent applications is disclosed one kind of device composed of a body of semiconductor material having four distinct layers with adjacent layers being of opposite conductivity type to form a plurality of P-N junctions and having an electrical terminal on each of the outside layers. Two main current-carrying electrodes are provided, one making contact with an external layer and an adjacent intermediate layer, and the other making contact with the other external layer. A control electrode is provided making contact with said adjacent intermediate layer. When one main electrode is biased in one polarity with respect to the other terminal, the two P-N junctions nearest the main electrodes become, or tend to become, reversely biased and the center P-N junction becomes forwardly biased; thus a high impedance is presented between the electrodes. If a sufficiently large potential is applied between the terminals, the P-N junctions nearest the unshorted main electrode breaks down and current is conducted in the reverse direction across this junction. When the main electrodes are biased in the other polarity with respect to one another, the two P-N junctions nearest the main electrodes become, or tend to become, forwardly biased and the center P-N junction becomes reversely biased; thus a high impedance is again presented between the terminals. However, if the potential applied between the main electrodes is increased, or if control current of suitable magnitude and direction is applied, eventually not only does the center P-N junction break down, but reverses in polarization and a very low impedance is presented between the main electrodes. The layers and the electrodes are proportioned and oriented such that under the latter set of conditions the path of current flow from one main electrode to the other has a component generally parallel to a portion of the P-N junction spanned by one of said main electrodes which is remote from the main electrode. Such current flow biases the said portion of the junction in the forward direction to cause minority carrier injection across said junction into said adjacent intermediate layer, thereby enabling the forward conduction action described to be obtained.

Two requirements which must be fulfilled in order to obtain the reversal in polarity of the center P-N junction and hence conduction thereacross are (1) that one of the two transistor sections into which the device is resolvable, an NPN and a PNP transistor section with the center junction being the collector junction of both transistor sections, have a current gain, alpha, which increases with current, and (2) that the sum of the current gains of the two transistor sections be equal to or greater than unity at some intermediate current. The variable current gain requirement is obtained by virtue of the conductive short of one portion of the P-N junction formed between an external layer and an adjacent intermediate layer. The alpha sum requirement is obtained by application of sufficient voltage across the main electrodes and appropriate application of current to the control electrode. Devices of the kind described are extremely temperature stable for reasons fully described in the aforementioned application.

In the second of the above-mentioned patent applications is disclosed another kind of device similar to the device described above. However, a control electrode is provided making minority carrier injecting contact with the aforementioned adjacent intermediate layer and cooperatively associated with the innermost junction to provide transistor action therewith. Such a device has the capability of switching large currents in response to very small control currents without impairing the higher temperature stability characteristics of such a device.

The present invention is directed to the provision of switching devices of the kind described in which not only better control current sensitivity and better temperature stability are concurrently obtained but also greater flexibility in the design and operation of such devices. Particularly, the present invention is directed to greater flexibility and selectivity in rendering such devices conductive and also for rendering such devices non-conductive.

Accordingly, it is an object of the present invention to provide semiconductor devices of improved characteristics.

It is a further object of the present invention to provide novel four-layer, four-electrode switching devices having greater capability and flexibility in circuit application than conventional devices.

In carrying out the present invention in one illustrative form thereof, a body of semiconductor material having two opposed major faces and including four layers of one and the opposite conductivity type provided between the major faces. The layers of one conductivity type are interleaved with layers of the opposite conductivity type to form a plurality of P-N junctions therein. An electrode is provided making low resitsance ohmic contact at one major face with a surface of an external layer of said body and an exposed surface of an adjacent intermediate layer. Another electrode is provided making low resistance ohmic contact at the opposite major face with a surface of the other external layer of said body. A third electrode is provided making minority carrier injecting contact with the aforementioned adjacent intermediate layer and cooperatively associated with the innermost junction to provide transistor action therewith. A fourth electrode is provided making low resistance ohmic contact with the aforementioned intermediate layer preferably remote from that portion of the junction which is shorted by said one electrode.

Further objects and advantages of the present invention will be more clearly understood by reference to the following description taken in connection with the accompanying drawings and its scope will be apparent in the appended claims.

Figure 1:
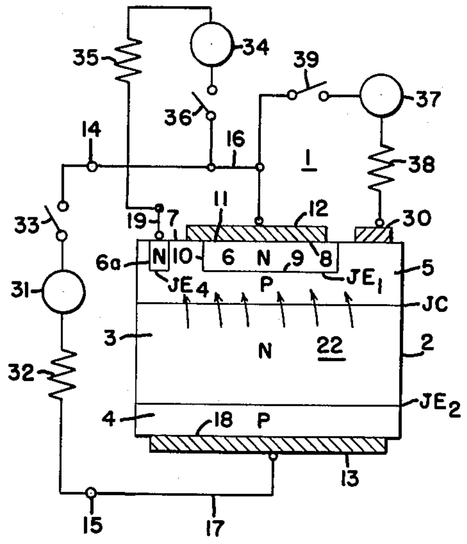
FIGURE 1 shows a sectional view of a four-layer, four-electrode switching device in accordance with the present invention.

Referring now in particular to FIGURE 1, there is shown a cross-sectional view of an illustrative embodiment of the present invention. FIGURE 1 shows a semiconductor device 1 comprising a body of semiconductor material 2 having four layers or regions therein, an N-type conductivity intermediate region 3, a P-type conductivity external region 4, a P-type conductivity intermediate region 5 adjacent thereto, and an N-type conductivity external region 6 adjacent the P-type intermediate region 5. These regions meet to form three generally parallel P-N junctions, $J_C$, $JE_1$, and $JE_2$. $J_C$ is referred to as the collector or center junction and is formed between the N-type region 3 and the P-type region 5. $JE_1$ is referred to as the first emitter junction and is formed between the P-type layer 5 and N-type layer 6. $JE_2$ is referred to as the second emitter junction and is formed between N-type layer 3 and P-type layer 4. The intermediate P-type region 5 surrounds the N-type region 6 on two sides and has a surface 7 coplanar with the outside surface 8 of region 6. As illustrated, the coplanar surfaces 7 and 8 form part of the upper major face of the semiconductor body 2. Junction $JE_1$ has a substantial portion generally parallel to a surface 8 and a portion of lesser extent 10 generally perpendicular to and meeting with external surfaces 7 and 8 of regions 6 and 5, respectively. The body 2 has a pair of opposed surfaces generally parallel to the collector junction $J_C$. One opposed major face or surface 18 comprises the external surface of the P-type region 4 and the other comprises the external surface 8 of the N-type region 6 and external surface 7 of intermediate P-type region 5 coplanar therewith. A conductive electrode 13 is secured in good conductive contact with the external surfaces 7 and 8 and another conductive electrode 13 is secured in good conductive contact to the external surfaces 18. Electrode 12 spans and short circuits junction $JE_1$ along a line whose projection perpendicular to the plane of the drawing is point 11. Electrodes 12 and 13 are connected to external terminals 14 and 15 by leads 16 and 17, respectively. A minority carrier injecting region 6*a*, a region of N-type conductivity, for example, is provided in the layer 5 which extends out to the top surface of the device on that side of the junction $JE_1$ which is adjacent to the portion of $JE_1$ which is short circuited and forms $JE_4$ therewith. Electrode 19 is connected to region 6*a*. A low resistance ohmic contact also is provided in the layer 5 on that side of junction $JE_1$ which is remote from the part of $JE_1$ which is short circuited by means of electrode 30.

Region 6*a* is of smaller extent than region 6 and forms with P-type regions 4 and 5, and N-type region 3, another four-layer, three-electrode switching device with electrodes 12, 13 and 19 being the external electrodes therefor. The region 6*a* may be differently formed than region 6, i.e. it may be more heavily N-type conductivity and it may be more closely spaced to $J_C$ than $JE_1$ and thus could be made appreciably more efficient as an emitter than region 6 and require only small triggering currents to render the device conductive between electrodes 12 and 13.

A voltage source 31, a current limiting impedance 32 and a switch 33 are connected in series between terminals 14 and 15. Another voltage source 34, a current limiting impedance 35 and a switch 36 are connected in series between electrode 19 and terminal 14. Also, a voltage source 37, a current limiting impedance 38, and a switch 39 are connected in series between electrode 30 and electrode 12.

Figure 2:
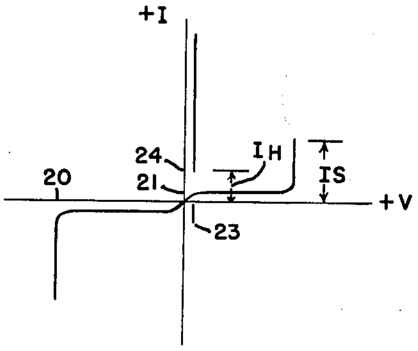
FIGURE 2 is a graph of current versus voltage useful in explaining the operation of the device of FIGURE 1.

The operation of the device of FIGURE 1 will be explained by reference to FIGURE 2 which shows a graph of the voltage versus current characteristics of the device of FIGURE 1. In the graph the current flow between the electrodes 12 and 13 is represented as the ordinate and the voltage applied across the electrodes is represented as the abscissa. Assume that an increasing voltage is applied by closing switch 33 so as to render electrode 12 increasingly positive with respect to electrode 13. Junction $JE_1$ tends to become and $JE_2$ becomes reversely biased and thus blocks current flow thereacross. The collector junction $J_C$ is forwardly biased. Thus a high impedance is presented across electrodes 12 and 13 until avalanche breakdown voltage of the emitter junction $JE_2$ is reached corresponding to voltage represented by abscissa 20 on graph. Assume that an increasing voltage is applied between electrodes 12 and 13 to render electrode 12 increasingly negative with respect to electrode 13. With such voltage applied, junctions $JE_1$ and $JE_2$ become forward biased and junction $J_C$ becomes reversely biased. At low currents emitter junction $JE_1$ is practically inoperative as an emitter because of the shorting of the regions 5 and 6 by electrode 12. As the voltage across the device increases, only a small saturation current flows representing reverse current across junction $J_C$ shown as ordinate 21 on the graph of FIGURE 2. As the voltage approaches the avalanche voltage $V_{BO}$ of collector junction $J_C$, the current flow across junction $J_C$ represented by arrow 22 is parallel to the emitter junction $JE_1$ toward the surface 7 and increases rapidly. The resulting voltage drop produced by this current flow in region 5 along junction $JE_1$ forward biases $JE_1$ with the largest bias occurring at the right-hand edge of the junction farthest from the shorting contact 12. The effective emitter efficiency, and hence alpha, increases rapidly with increased current flow. When the current reaches a level $I_s$ referred to as turn-on current at which the alpha sum of the NPN and the PNP transistor sections of the device is greater than unity, the device switches to the low voltage state and to a voltage corresponding to abscissa 23. The transition is very abrupt for the reason that as the voltage across collector junction $J_C$ drops, the current originally distributed over the entire region 5 now shifts mainly to the edge of region 6 remote from portion 10 and the current density becomes very high. The device switches to the low voltage state at a still higher current level at which the alpha sum requirement is met. Once the switch is on, sufficient biasing of the base region 5 must still be maintained to hold the emitter in strong forward bias. Since $J_C$ is now in forward bias, avalanche effects of $J_C$ no longer are significant in maintaining conduction of the device. When external circuit requirements are such that the current $I_H$ is less than the minimum value necessary to maintain the device in conduction as represented by ordinate 24, the device ceases to conduct and reverts to its non-conductive state. In the region of heavy forward conduction, most of the emitter is biased into conduction and the device exhibits the low impedance characteristic of conventional PNPN switch devices. With respect to the characteristics shown in FIGURE 2, it is found possible to vary the value of the switch-on current $I_s$ to be greater than, equal to, or less than the hold current $I_H$, as explained in the aforementioned patent application for Serial Number 838,504.

The manner of operation of control region 6*a* will be explained with respect to the family of graphs in FIGURE 3. The family of graphs labelled $I_{G1}$, $I_{G2}$, $I_{G3}$ and $I_{G4}$ show the current versus voltage characteristics for the NPNP section comprising regions 6a, 5, 3 and 4 for increasing values of current $I_G$ applied through electrode 12 to this section. The increased current flow from electrode 12 to electrode 19 through regions 5 and 6a is obtained by appropriately negatively biasing electrode 19 with respect to electrode 12 by means of generator 34 with switch 36 closed so as to permit region 19 to function as an emitter. Increased biased across electrode 19 with respect to electrode 12 independently increases the injection into region 5, thereby raising the alpha of the NPN part of the four-layer switch section of which it is a part. When the alpha-increasing-with-current and the alpha-sum requirements referred to above are met by this section of the device, the center junction breaks down and reverses its polarity as explained above. This condition existing for the indicated small section of the device permits sufficient current to flow across $J_C$ to cause the main section of the four-layer device to break down and conduct. Thus a low impedance is presented between the electrodes 12 and 13 as the conditions above mentioned for breakdown between these electrodes are met. It should be noted that the initiation of conduction over the control section of the device is independent of the temperature stabilizing effect of the shorted emitter structure. It has been already mentioned above that region 6a may be made very small and hence require only small injection currents to initiate the breakdown of the junction $J_C$. Also, the efficiency of region 6a as an emitter may be augmented and located very close to $J_C$ without affecting the reverse voltage breakdown characteristic of the device, yet enabling a higher alpha to be obtained in the NPN section, thereby increasing its sensitivity as well as the overall control sensitivity of the device.

Figure 3:
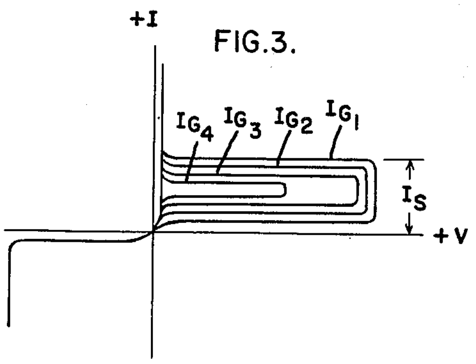
FIGURE 3 is an idealized graph of the current versus voltage characteristics of the device of FIGURE 1 showing the characteristics for various values of control current.

The device of FIGURE 1 may also be rendered conductive to produce a set of characteristics similar to the characteristics of FIGURE 3 by appropriately positively biasing electrode 30 with respect to electrode 12 by means of generator 37 with switch 39 closed and switch 36 open so as to permit injection of minority carriers from region 6 into region 5. Increased bias across electrode 30 with respect to electrode 12 independently increases injection at the edge of emitter 6 nearest electrode 30, thus permitting the two conditions referred to above to be met by a lower value of voltage applied across the load-carrying electrodes 12 and 13 than without such injection.

In addition to turn-on capability, the electrode 30 provides the device of FIGURE 1 with turn-off capability. By the application of a negative bias to electrode 30 with respect to electrode 12, the junction $JE_1$ becomes reversely biased and current is shunted from electrode 12 to electrode 30, thereby rendering the device non-conductive between electrodes 13 and 12. Conduction of current by electrode 30 will lower the alpha of the NPN section of the device. When the sum of the alphas of the NPN and PNP sections of that portion of the device between electrodes 12 and 13 is lowered below unity, this portion will revert to its high impedance state. It should be noted that diversion of current to electrode 30 has the effect of providing an additional voltage drop along the shorted junction, thereby tending to render it reversely biased. This action is obtained regardless of whether conduction exists between electrode 13 and 19 or regardless of how conduction was initiated between electrodes 13 and 12, by electrode 19, for example. For this purpose it is desirable to make electrode 30 a large area contact.

Figure 4:
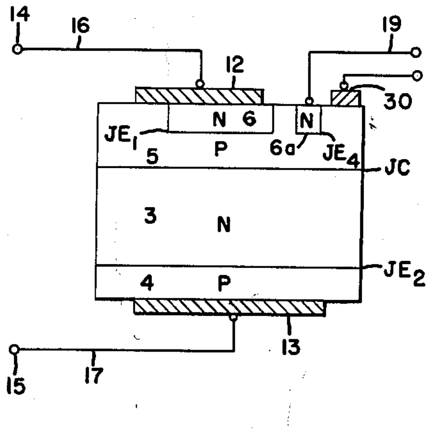
FIGURE 4 shows a sectional view of another embodiment of a four-layer, four-electrode switching device in accordance with the present invention.

However, if region 6a is located adjacent to electrode 30 as in FIGURE 4, for example, where corresponding elements are denoted by the same designations, negative bias applied to electrode 30 would render the device non-conductive between electrodes 13 and 19. In the device of FIGURE 4, negatively biasing electrode 30 with respect to electrode 12 could inhibit the effect of negatively biasing electrode 19 with respect to electrode 12 and maintain the device in its high impedance state despite the fact that the voltage applied to electrode 19 would otherwise be sufficient to switch it to its low impedance or conductive state. The device of FIGURE 4 also provides a means for independently switching the device on. With voltage applied between electrodes 12 and 13, the device could be rendered conductive by biasing electrode 19 negatively with respect to electrode 30. This arrangement is advantageous when it is desirable to completely isolate the control circuit from the load circuit for such a device.

The devices of FIGURES 1 and 4 could be fabricated by techniques such as those disclosed in the aforementioned patent applications. With the devices shown in FIGURES 1 and 4, negative firing or gating pulses could be used to both turn the device on and turn it off as well. Such a capabilty has extensive applicability in circuits useful in computer apparatus. These devices may be used in the manner indicated in circuits in which the conventional controlled rectifiers are used, of course, appropriate allowance being made for polarities, as well as in circuits yet to be devised.

While the invention has been shown and described in connection with particular embodiments of the invention, it will be apparent to those skilled in the art that changes and modifications may be made without departing from the invention in its broader aspects. For example, while the devices have been generally illustrated in rectilinear geometries, it will be understood that circular, cylindrical and other geometries may be used. Also, the device could have the conductivity of the various regions thereof reversed to that described. Of course, voltages and currents applied to such a device would also have to be reversed. It is, therefore, intended that the appended claims cover all such changes and modifications as fall within the true spirit and scope of the invention.

What I claim as new and desire to secure by Letters Patent of the United States is:

1. A semiconductor device comprising a body of semiconductor material having a pair of major faces on opposite sides thereof and including four layers of one and the opposite conductivity type between said major faces, layers of one conductivity type being interleaved with layers of the opposite conductivity type forming a plurality of P-N junctions therein, an electrode on one of said pair of major faces in low resistance ohmic contact with a surface of an external layer of said body and an adjacent exposed surface of an adjacent intermediate layer, another electrode on the opposite one of said pair of major faces in low resistance ohmic contact with a surface of the other external layer of said body, a zone of said one conductivity type in said adjacent intermediate layer, a third electrode connected to said zone, and a fourth electrode connected in low resistance ohmic contact to said adjacent intermediate layer.

2. A semiconductor device comprising a body of semiconductor material having a pair of major faces on opposite sides thereof and including four layers of one and the opposite conductivity type between said major faces, layers of one conductivity type being interleaved with layers of the opposite conductivity type forming a plurality of P-N junctions therein, a first electrode on one of said pair of major faces in low resistance ohmic contact with a surface of an external layer of said body and an adjacent exposed surface of an adjacent intermediate layer, a second electrode opposite one of said pair of major faces in low resistance ohmic contact with a surface of the other external layer of said body, a zone of said one conductivity type in said adjacent intermediate layer conductively adjacent to said first electrode, a third electrode connected to said zone, and a fourth electrode connected in low resistance ohmic contact to said adjacent intermediate layer.

3. A semiconductor device comprising a body of semiconductor material having a pair of major faces on opposite sides thereof and including four layers of one and the opposite conductivity type between said major faces, layers of one conductivity type being interleaved with layers of the opposite conductivity type forming a plurality of P-N junctions therein, a first electrode on one of said pair of major faces in low resistance ohmic contact with a surface of an external layer of said body and an adjacent exposed surface of an adjacent inetrmediate layer, a second electrode in low resistance ohmic contact with a surface of the other external layer of said body, a zone of said one conductivity type in said adjacent intermediate layer conductively remote from said first electrode, a third electrode connected to said zone, and a fourth electrode connected in low resistance ohmic contact to said adjacent intermediate layer.

4. A semiconductor device comprising a body of semiconductor material having a pair of major faces on opposite sides thereof and including four layers of one and the opposite conductivity type between said major faces, layers of one conductivity type being interleaved with layers of the opposite conductivity type forming a plurality of P-N junctions therein, a first electrode on one of said pair of major faces in low resistance ohmic contact with a surface of an external layer of said body and an adjacent exposed surface of an adjacent intermediate layer, a second electrode on the opposite one of said pair of major faces in low resistance ohmic contact with a surface of the other external layer of said body, a zone of said one conductivity type in said adjacent intermediate layer conductively remote from said first electrode, a third electrode connected to said zone, and a fourth electrode connected in low resistance ohmic contact to said adjacent intermediate layer, said zone and said fourth electrode being adjacent one another.

5. In circuit, a semiconductor device comprising a body of semiconductor material having a pair of major faces on opposite sides thereof and including four layers of one and the opposite conductivity type between said major faces, layers of one conductivity type being interleaved with layers of the opposite conductivity type forming a plurality of P-N junctions therein, a first electrode on one of said pair of major faces in low resistance ohmic contact with a surface of an external layer of said body and an adjacent exposed surface of an adjacent intermediate layer, a second electrode on the opposite one of said pair of major faces in low resistance ohmic contact with a surface of the other external layer of said body, a zone of said one conductivity type in said adjacent intermediate layer, a third electrode connected to said zone, a fourth electrode connected in low resistance ohmic contact to said adjacent intermediate layer, circuit means for applying a signal of one polarity between said third electrode and said first electrode to render conductive the P-N junction formed therebetween thereby rendering said body between said first and said second electrode conductive, and circuit means for applying a signal of the same polarity between said fourth electrode and said first electrode to render said body non-conductive between said first and second electrode.

6. A semiconductor device comprising a body of semiconductor material having a pair of major faces on opposite sides thereof and including four layers of one and the opposite conductivity type between the two major faces of said body, layers of one conductivity type being interleaved with layers of the opposite conductivity type forming a plurality of P-N junctions therein, and adjacent intermediate layer surrounding one end layer to define therewith a common surface in one of said faces, a first electrode in contact with said adjacent intermediate layer and said one end layer in said surface, another end layer having a surface forming the opposite major face of said body, a second electrode in ohmic contact with said opposite major face of said body, a zone of said one conductivity type in said adjacent intermediate layer, a third contact to said zone, and a fourth contact connected to said adjacent intermediate layer.

7. A semiconductor device comprising a body of semiconductor material having a pair of major faces on opposite sides thereof and including four layers of one and the opposite conductivity type between said two major faces of said body, layers of one conductivity type being interleaved with layers of the opposite conductivity type forming a plurality of P-N junctions therein, one end layer of said one conductivity type and an adjacent intermediate layer of said opposite conductivity type being disposed to define a common surface in one of said major faces, a first electrode in ohmic contact with said one end layer and said adjacent intermediate layer in said surface, another end layer of said body having a surface defining the other major face of said body, a second electrode in low resistance ohmic contact with said other major face of said body, a zone of said one conductivity type in said adjacent intermediate layer of said opposite type conductively remote from said first electrode, a third electrode connected to said zone, a fourth electrode connected in low resistance ohmic contact to said adjacent intermediate layer of opposite conductivity type, said zone and said fourth electrode being adjacent to one another.

8. A semiconductor device comprising a body of semiconductor material having a pair of major faces on opposite sides thereof and including four layers of one and the opposite conductivity type between said major faces, layers of one conductivity type being interleaved with layers of the opposite conductivity type forming a plurality of P-N junctions therein, a first electrode on one of said pair of major faces in low resistance ohmic contact with a surface of an external layer of said body and an adjacent exposed surface of an adjacent intermediate layer, a second electrode on the opposite one of said pair of major faces in low resistance ohmic contact with a surface of the other external layer of said body, a zone of said one conductivity type in said adjacent intermediate layer conductively remote from said first electrode, a third electrode connected to said zone, and a fourth electrode connected to a low resistance ohmic contact to said adjacent intermediate layer, said zone and said fourth electrode being adjacent to one another with said zone lying between said fourth electrode and said external layer of said body.

9. In circuit, a semiconductor device comprising a body of semiconductor material having a pair of major faces on opposite sides thereof and including four layers of one and the opposite conductivity type between said major faces, layers of one conductivity type being interleaved with layers of the opposite conductivity type forming a plurality of P-N junctions therein, a first electrode on one of said pair of major faces in low resistance ohmic contact with a surface of an external layer of said body and an adjacent exposed surface of an adjacent intermediate layer, a second electrode on the opposite one of said pair of major faces in low resistance ohmic contact with a surface of the other external layer of said body, a zone of said one conductivity type in said adjacent intermediate layer, a third electrode connected to said zone, a fourth electrode connected in low resistance ohmic contact to said adjacent intermediate layer, whereby a signal of one polarity applied between said third electrode and said first electrode renders said body between said first and said second electrode conductive and whereby a signal of the same polarity applied between said fourth electrode and said first electrode renders said body non-conductive between said first and second electrodes.

10. In circuit, a semiconductor device comprising a body of semiconductor material having a pair of major faces on opposite sides thereof and including four layers of one and the opposite conductivity type between said major faces, layers of one conductivity type being interleaved with layers of the opposite conductivity type forming a plurality of P-N junctions therein, a first electrode on one side of said major faces in low resistance ohmic contact with a surface of an external layer of said body and an adjacent exposed surface of an adjacent intermediate layer, a second electrode on the opposite one of said pair of major faces in low resistance ohmic contact with a surface of the other external layer of said body, a zone of said one conductivity type in said adjacent intermediate layer, a third electrode connected to said zone, a fourth electrode connected in low resistance ohmic contact to said adjacent intermediate layer, whereby a signal of one polarity applied between said fourth electrode and said first electrode maintains said body between said first and said second electrode non-conductive and in the absence of which a signal applied between said third electrode and said first electrode renders said body conductive.

References Cited in the file of this patent

UNITED STATES PATENTS

| | | |
|---|---|---|
| 2,959,504 | Ross | Nov. 8, 1960 |
| 2,962,605 | Grosvalet | Nov. 29, 1960 |
| 2,971,139 | Noyce | Feb. 7, 1961 |
| 2,985,804 | Buie | May 23, 1961 |
| 3,070,762 | Evans | Dec. 25, 1962 |

UNITED STATES PATENT OFFICE

CERTIFICATE OF CORRECTION

Patent No. 3,124,703 March 10, 1964

Tage P. Sylvan

It is hereby certified that error appears in the above numbered patent requiring correction and that the said Letters Patent should read as corrected below.

Column 3, line 48, for "electrode 13" read -- electrode 12 --; column 6, line 65, for "electrode opposite" read -- electrode on the opposite --.

Signed and sealed this 21st day of July 1964.

(SEAL)

Attest:

ESTON G. JOHNSON
Attesting Officer

EDWARD J. BRENNER
Commissioner of Patents